July 24, 1934.  H. A. PALMER  1,967,970
SYSTEM FOR SUPPLYING FUEL TO INTERNAL COMBUSTION ENGINES
Filed April 29, 1932  2 Sheets-Sheet 1
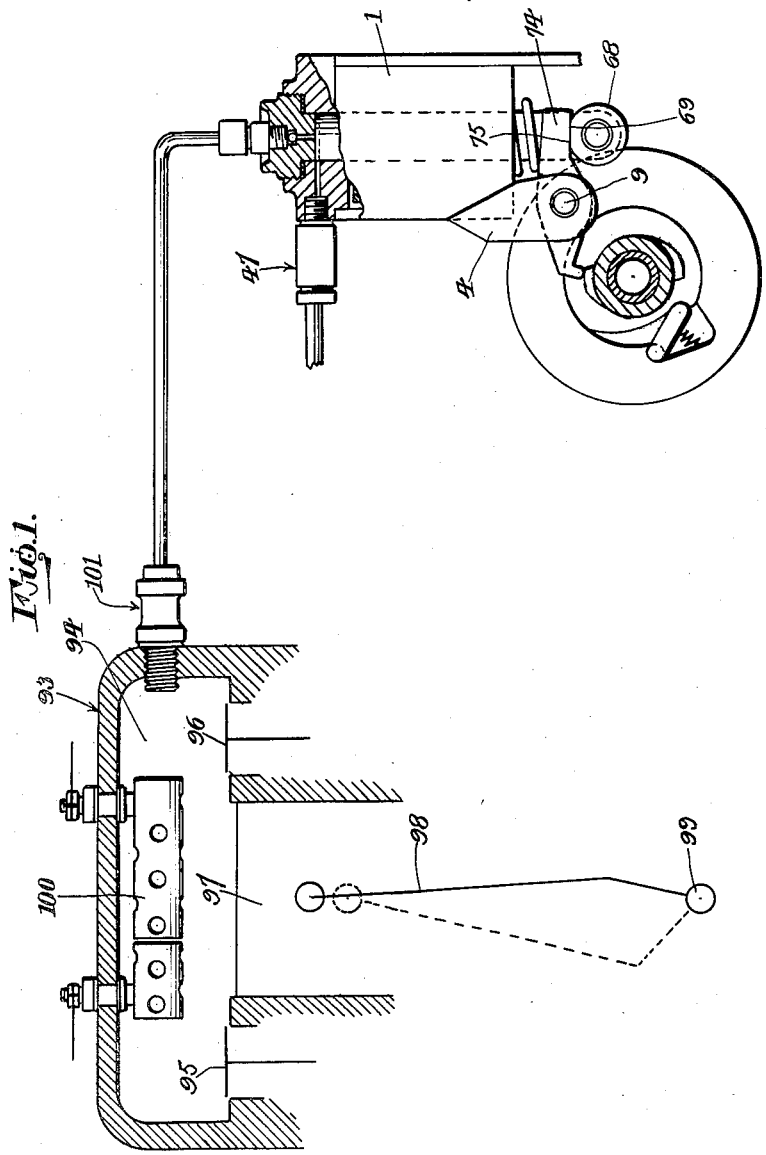
Inventor
Harry A. Palmer
By Geo. P. Kimmel
Attorney July 24, 1934.       H. A. PALMER       1,967,970
SYSTEM FOR SUPPLYING FUEL TO INTERNAL COMBUSTION ENGINES
Filed April 29, 1932    2 Sheets-Sheet 2
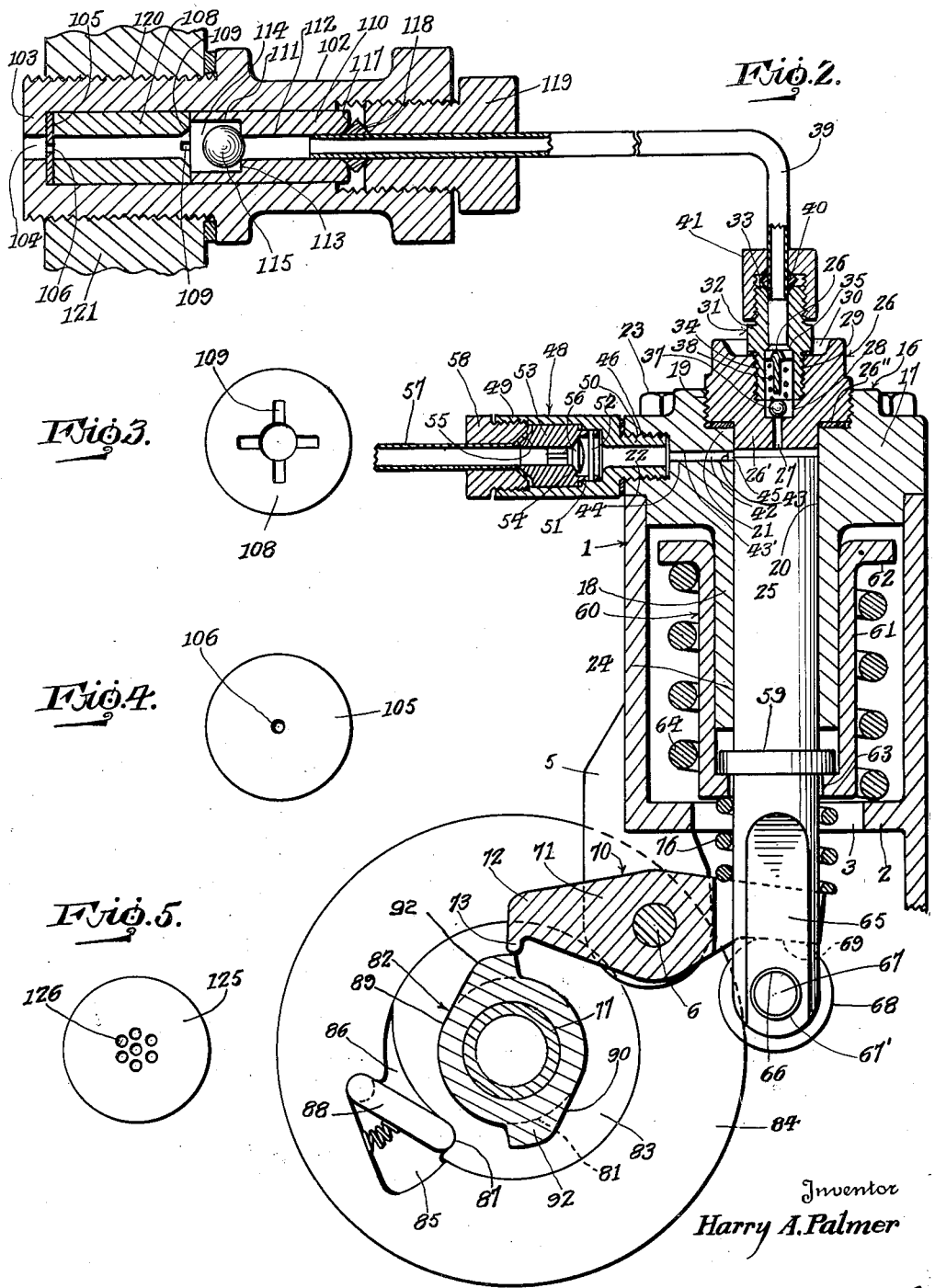
Inventor
Harry A. Palmer
By Geo. F. Kimmel
Attorney Patented July 24, 1934

1,967,970

UNITED STATES PATENT OFFICE 1,967,970

SYSTEM FOR SUPPLYING FUEL TO INTERNAL COMBUSTION ENGINES

Harry A. Palmer, Boston, Mass., assignor to Palmer Inventions, Incorporated, a corporation of Massachusetts Application April 29, 1932, Serial No. 608,329

3 Claims. (Cl. 299—107.1)

This invention relates to a system of supplying fuel to internal combustion engines, and has for its object to provide, in a manner as hereinafter set forth, means for supplying at a high rate of speed a fuel charge to the combustion chamber of the engine, at a period during the compression stroke of the engine to provide for the combusting of the charge immediately following the entrance of the latter into the combustion chamber.

A further object of the invention is to provide, in a manner as hereinafter referred to, a system for supplying at a high rate of speed a fuel charge to the combustion chamber of an internal combustion engine at a period in very close proximity to the point when the piston of the engine reaches high center on its compression stroke, thereby providing for the combusting of the charge immediately following the entrance of the latter into the combustion chamber.

A further object of the invention is to provide, in a manner as hereinafter set forth, a system for supplying at a high rate of speed a fuel charge to the combustion chamber of an internal combustion engine at a period corresponding to a point approximately ten degrees before the piston of the engine reaches high center on the compression stroke thereof, thereby providing for the combusting of the charge immediately following the entrance of the latter into the combustion chamber.

A further object of the invention is to provide, in a manner as hereinafter set forth, a system for the purpose set forth, which is active only during the compression stroke of the piston of the engine, such activity being the intaking of fuel into the system and the injecting of fuel, at a high speed rate, from the system into the combustion space of the engine.

A further object of the invention is to provide, in a manner as hereinafter set forth, a system for the purpose referred to including a valve controlled injector nozzle opening into the combustion space of the engine, a pumping mechanism for operation solely during the compression stroke of the engine piston and including a valve controlled outlet communicating with the nozzle, and a valve controlled fuel supply nozzle opening into the pumping mechanism, and with the valves of said nozzle and outlet acting to prevent leakage when the pumping mechanism is inactive and when the fuel is combusted.

To the above ends essentially, and to others which may hereinafter appear, the system consists of such parts, and such combination of parts which fall within the scope of the invention as claimed.

In the drawings:

Figure 1 is an elevation, partly in section, of the elements of a fuel supply system, in accordance with this invention showing the adaptation therewith of a fuel operated internal combustion engine, the latter being shown substantially diagrammatically.

Figure 2 is a vertical sectional view of the elements of the system.

Figure 3 is an elevation looking towards the rear end of a sleeve forming a part of the fluid ejector nozzle.

Figure 4 is an elevation of the fluid discharge controlling disc forming a part of the fluid ejector nozzle.

Figure 5 is an elevation of a modified form of a fluid discharge controlling disc.

The system is coupled to the engine with which it is associated in a manner so that its operation will be had solely during the compression stroke of the piston of the engine, and further whereby the fuel charge will be injected into the combustion chamber of the engine at a high rate of speed just before the engine piston reaches high center on its compression stroke thereby providing for the combusting of the charge immediately following the entrance of the latter into the combustion chamber.

Referring to the drawings, 1 indicates a tubular element providing a pump casing open at its top and formed with a bottom 2 provided with a central enlarged opening 3. Extended from casing 1 is a pair of spaced parallel apertured arms 4, 5 for supporting a throttle shaft 6.

Seated on the open top of and extended into casing 1 is a pump body 16 formed of a centrally circular apertured head part 17 and a cylindrical guide part 18, the former being of a width greater than the diameter of and integral at its inner end with the latter. The wall of the aperture or inner side of part 17 is upon two different diameters. That portion of the inner side of part 17 of greatest inner diameter is indicated at 19 and that portion of smallest inner diameter at 20. The portion 19 is of less length than portion 20, and opens at the outer end of the head part 17. The providing of the inner side of part 17 of two different diameters, forms an internal shoulder or seat 21. The portion 19 of the inner side of part 17 is threaded. The inner diameter of part 18 is uniform throughout and is the same as and forms a continuation of the portion 20 of the inner side of part 17. The latter is rabbeted on its outer side, as at 22 to provide for part 17 to seat on the outer end edge of and extend into the casing 1. The pump body 16 is secured to casing 1 by holdfast devices 23. A part of the portion 20 of the inner side of part 17 and the entire inner side of part 18 provides a chamber 24 for a combined fuel intaking and fuel expelling reciprocatory plunger 25 which has a snug sliding fit with the wall of chamber 24. The latter is open at its inner end and closed at its outer end by a peripherally threaded and shouldered plug 26 formed with a port 27 extending from the inner end of and opening into a valve receiving pocket 28 formed in the plug intermediate its ends. The plug 26 is formed with a bore 29 of greater diameter than and which opens at its inner end into pocket 28. The outer end of bore 29 communicates with a cavity 30 formed in the outer end of plug 26. The wall of bore 29 is threaded. The plug 26 has a reduced inner part 26′ which extends into the portion 19 of the inner side of part 17 of pump body 16. The peripheral shoulder of the plug engages a packing 26″ mounted on seat 21. The threads of the plug engage with the threaded portion 19 of the inner side of the pump body 16. The plug 26 extends outwardly from the latter.

Secured to the wall of bore 29 is a tubular coupling member 31 formed of an intermediate, an outer and an inner part 32, 33 and 34 respectively. The part 32 is of greater diameter than parts 33, 34. The part 33 is of greater outer diameter than part 34. The inner diameter of parts 32, 33 is the same, but of less diameter than the inner diameter of part 34. The parts 33, 34 are peripherally threaded. The part 34 engages with the wall of bore 29 and has its inner diameter the same as the diameter of pocket 28. Part 32 is arranged within and extends from cavity 30. At the point of mergence of part 34 with part 32, a valve seat 35 is formed for a ported valve 36 of T-shape cross section. Arranged within part 34, surrounding the stem of valve 36 and interposed between the head of the latter and a check valve 37 is a controlling spring 38. The valve 37 is normally arranged in pocket 28. The stem of valve 36 is spaced from valve 37 and constitutes a stop for the arresting of the opening movement of the latter. Extended into the outer end of part 33 is a fuel conducting pipe 39 which leads to an ejector nozzle for extension into the combustion chamber of the engine. A packing 40 surrounds pipe 39 and is seated on the outer edge of part 33. A packing gland 41 surrounds pipe 39, encloses packing 40 and threadedly engages with the periphery of part 33.

The part 17 of the pump body 16 is formed with a horizontally disposed fuel intake chamber 42 which is shallow and gradually increasing in width from its outer open end to its inner end wall 43. The chamber 42 is disposed at right angles to chamber 24 and has its top wall 43′ below and in very close proximity to the inner end of plug 26. The bottom wall 44 of chamber 42 is arranged in close proximity to the inner end of plug 26. Communication is had between the chamber 42 and the upper end of chamber 24 by a series of spaced ports 45 in the wall 43. The arrangement is such that when the plunger 25 moves inwardly about .006 of an inch, the intake from chamber 42 to chamber 24 starts. The part 17 of pump body 16 is formed with a circular pocket 46 which opens into the outer end of chamber 42. The wall of pocket 46 is threaded for securing thereto the fuel inlet valve mechanism 47 for the pump. The mechanism comprises a tubular body portion 48 having an enlarged outer part 49 and a reduced inner part 50, the latter being peripherally threaded to secure it to the threaded wall of opening 46. Arranged within part 49 is a collar 51 carrying a valve stop 52. Positioned in part 49 and bearing against the outer end edge of collar 51, is a sleeve 53, having its inner end formed with a valve seat 54. The outer end 55 of sleeve 53 is beveled. Slidably mounted in sleeve 53 is the stem of a check valve 56 which coacts with the seat 54 for closing the mechanism 47 to supply and to arrest any outward expulsion of the fuel from chamber 42 from passing to the supply or feed pipe 57, which is clamped against the outer end of sleeve 53 by a tubular plug 58, mounted on pipe 57 and threadedly engaging with the inner face of part 49 at the outer end of the latter.

The plunger 25 is formed with an annular peripheral shoulder 59 for a purpose to be referred to. Surrounding and extending inwardly from the part 18 of the pump body 16, is a reciprocatory driver 60 for the plunger 25, and which acts upon the latter to provide its fuel expelling stroke. The driver 60 coacts with the shoulder 59. The driver 60 includes a sleeve 61 formed at its outer end with an outwardly directed annular flange 62, and at its inner end with an inwardly directed annular flange 63. The latter is arranged inwardly with respect to and is adapted to abut against shoulder 59 to impart to the plunger 25 a fuel charge ejecting or expelling stroke. The sleeve 61 encompasses part 18. The driver 60 is arranged in casing 1 and is of a diameter to pass through opening 3 on its inward movement. The driver 60 also provides a compressing means for an actuating spring 64 therefor. The spring 64 encompasses sleeve 61 and is interposed between flange 62 and the bottom 2 of casing 1.

The inner portion 65 of plunger 25 is reduced and formed with an opening 66 through which extends a headed pin 67 provided with a locking ring 67′. Carried by the pin 67, at each side of portion 65 of plunger 25, are abutment members 68 each having a flat working surface 69.

Pivotally mounted on shaft 6, is a pawl 70 for shifting plunger 25 inwardly to provide for driver 60 to compress spring 64. The pawl 70 includes a centrally apertured intermediate part 71, an outer end part 72 formed with a depending nose 73, and a bifurcated inner part to form a pair of spaced arms 74 for straddling the portion 65 of plunger 25. The arms 74 have flat working surfaces 75 for seating upon the working surfaces 69 of the abutment members 68. The arms 74 are maintained against surfaces 69 by a retaining spring 76 which surrounds the inner portion of plunger 25 and is interposed between flange 63 and the upper edges of arms 74.

Arranged adjacent to and below shaft 9 is a stationary shaft 77 and revolubly mounted on shaft 77 is a cam operating shaft 81. The cam, indicated at 82 is integral with shaft 81 at one end of the latter. Integral with the other end of shaft 81 is a peripheral collar 83 encompassed and driven from a driver 84, the latter is to be connected to and operated from any suitable means, not shown, actuated from the engine. The arrangement is to be such that shaft 81, cam 82, collar 83 and driver 84 will revolve together bodily, except when the engine backfires and causes the driver to operate reversely.

The driver 84 is formed with a pocket 85. The collar 83 is cut out on one side, as at 86 to provide a shoulder 87. Arranged within pocket 85 and engaging the shoulder 87 is a spring controlled latch 88 which couples the collar and driver 84 together to provide for the bodily movement referred to. When the engine backfires and reverses, the movement of driver 84 the cam shaft 81 remains stationary, until the driver 84 operates in its normal direction and the latch 88 engages shoulder 87.

The cam 82 is formed with a pair of oppositely disposed working surfaces 89, 90 which gradually rise and terminate into a pair of oppositely disposed lobes 91, 92.

The nose 73 of pawl 70, travels successively upon the surfaces 89, 90 from the low part to the high part of the latter, whereby the pawl 70 is shifted on its shaft 9, in a manner to lower the arms 74 thereof, until the nose 73 clears the lobes and drops upon the low parts of the surfaces 89, 90. When the pawl 70 is shifted to lower its arms 74, the latter bearing against the members 68, will shift the plunger 25 inwardly to open the fuel intake chamber 42 to the chamber 24 drawing fuel into the latter forwardly of plunger 25. When the latter is moved inwardly, the shoulder 59 bearing against flange 63, will carry driver 60 therewith compressing spring 64. Upon the nose 73 clearing a lobe the drive 60 will be released and spring 64 acting upon the latter will project driver 60 outwardly, which carries the plunger 25 therewith and provides the fuel charge ejecting or expelling stroke for the latter.

The foregoing operation is to be carried out during the period for the compression stroke of the engine and the mechanism is so connected with the engine to provide for its operation at the period referred to. The plunger 25, after its fuel charge ejecting or expelling stroke will be held tightly against plug 26 by springs 64 and 74 to prevent leakage and also close ports 45.

The engine is designated 93, its combustion chamber 94, the air intake valve and exhaust valve for chamber 94 at 95, 96 respectively, its piston 97, reciprocating means for piston 97 at 98 and which is connected to crank shaft 99, an electrical perforated heater 100 for the supplied charge, and a fuel injector nozzle 101 which discharges the charge of fuel in a direction to impact the heater 100.

The nozzle 101 includes a tubular peripherally threaded and shouldered body part 102 having its outlet end formed with an inwardly extending annular flange 103 providing a restricted fuel injecting port 104. Positioned within the body part 102 and against the inner face of flange 103 is a fuel discharge controlling disc 105 provided with a central opening 106 which registers with and is of less diameter than port 104. Positioned within the body part 102 and against the rear face of disc 105 is the forward end of an axially channeled member or element 108 having the rear end edge formed with spaced radially disposed notches or grooves 109 formed with inwardly inclined inner walls. Each notch or groove has its inner end terminate at the wall of the channel provided by member 108 and its outer end terminates at the rear end edge of member 108 adjacent the outer corner of said edge. The inner corner at the rear end of member 108 provides a valve stop. The notches or grooves 109 provide by-passes for the fuel when the valve, to be presently referred to, is seated against the inner corner of the rear edge of member 108 to close the rear end of the bore of the latter. The member 108, as well as the disc 105 engages the inner face of body part 102. Abutting against the outer portion of the rear end of member 108 is a sleeve or annular member 110 having its inner face upon two different diameters, as at 111 and 112 to provide an annular shoulder 113. The portion 111 of the inner face of sleeve 110 is that part of greatest inner diameter of the sleeve and it provides a chamber 114 for a check valve 115 of globular form and of less diameter than that of chamber 114. The diameter of the valve 115 is such as not to close the notches or grooves 109 when the valve is seated against the inner corner at the rear edge of member 108. The rear edge of the latter forms the forward wall of chamber 115 and the free edge of shoulder 113 forms a seat for the valve 115. The chamber 114 is arranged in the forward end of sleeve 110. Extending into the rear end of the sleeve 110 is the fuel conducting pipe 39. A packing 118 surrounds pipe 39 and extends against the rounded inner portion of end 117 of sleeve 110. Threadedly engaging with the rear portion of the inner face of the body part 102 is a flanged, axially ported plug 119 encompassing pipe 39 and which clamps against packing 118. The forward portion of the outer face of body part 102 is threaded to engage with the threaded wall of an opening 120 formed in the wall 121 of the engine cylinder. The plug 119 acts to maintain flange 103, disc 105, member 108 and sleeve 110 in abutting relation. The member 108 and sleeve 110 provide a structure formed from end to end with a fuel conducting passage opening at the aperture in disc 105. The said passage is provided intermediate its ends with the valve chamber 115 which is formed with a rear wall and a forward wall, as well as a forward valve stop and a rearward valve seat respectively on said forward and rear walls.

The member 108 acts as a spacer between the disc 105 and sleeve 110. The valve 115 closes the passage formed by the portion of reduced inner diameter of sleeve 110 during the compression stroke of the piston of the engine. The valve 115 when shifted to open position bears against the stop formed on the rear end edge of member 108. The pressure of the charge delivered from the plunger chamber holds the valve 115 against its stop whereby the charge is separated into streams for passage through the by-pass into member 108, and which action controls the flow of the charge to disc 105.

The valve 115 is not operated on the suction stroke of the plunger, but it is operated on both the power and compression strokes of the engine piston and the pressure from such strokes holds it against its seat to close the line to the engine. The charge in the line between valves 37 and 115 is held in the line by the vacuum caused by valve 37 being closed. The valves 37 and 115 are simultaneously moved to open position by the pressure of the supplied fuel on the expelling stroke of the plunger.

Figure 5 discloses a modified form of fuel discharge controlling disc 125 formed with a group of spaced openings 126 at the central portion thereof. One of the openings 126 is arranged at the axis of disc 125.

The valve 52 closes the supply through the mechanism 47 on the expelling stroke of the plunger 25. The valve 37 normally closes the port 27 to the port 34 of element 31. The valve 115 closes the nozzle 101 to arrest any fuel entering the space 94 on the air intake stroke of piston 97. The port 27 provides the outlet for chamber 24. The plunger 25 seals the port 27 to chamber 24 and the latter to chamber 42 when plunger is at the end of its expelling stroke. The spring 64 is of such a nature, when released from a compressed state to shift the plunger 25 at a high rate of speed to rapidly inject the charge into the combustion space 94. The speed being substantially the same as the rate of speed of a jump spark. The spring 64 also maintains the plunger 25 in sealing position with respect to the intake and discharge to and from chamber 24 to prevent any leakage during the inactivity of the pumping mechanism.

What I claim is:—

1. In an internal combustion engine fuel supply system, a tubular body having means at one end to provide a restricted fuel discharge port for directly opening into the compression chamber of the engine, a disc within said body, arranged against said means and being formed with an aperture registering with and of less diameter than that of said port, a charge conducting structure arranged within said body having one end abutting said disc and provided throughout with a bore registering at one end with and of greater diameter than said aperture, said bore including forward and rear end portions and an intermediate portion, the latter being of greater diameter than said end portions and providing a valve chamber, the said structure at the rear end of said forward portion being formed with forwardly directed by-passes opening into the latter and a valve stop inwardly of the outer ends of the by-passes, said rear end portion being formed at its forward end with a valve seat and adapted at its rear end to receive a fuel charge line, and a valve in said chamber and normally engageable with said seat to close said rear end portion on the power stroke and during a part of the compression stroke of the engine and engageable with said stop on the expelling stroke of a fuel charge pumping mechanism to open said rear end portion to the valve chamber and to direct a charge through the by-passes into said forward end portion forwardly of the rear end of the latter.

2. In an internal combustion engine fuel supply system, a tubular body having means at one end to provide a restricted fuel discharge port for directly opening into the compression chamber of the engine, a disc within said body, arranged against said means and being formed with an aperture registering with and of less diameter than that of said port, a charge conducting structure arranged within said body having one end abutting said disc and provided throughout with a bore registering at one end with and of greater diameter than said aperture, said bore including forward and rear end portions and an intermediate portion, the latter being of greater diameter than said end portions and providing a valve chamber, the said structure at the rear end of said forward portion being formed with forwardly directed by-passes opening into the latter and a valve stop inwardly of the outer ends of the by-passes, said rear end portion being formed at its forward end with a valve seat and adapted at its rear end to receive a fuel charge line, and a valve in said chamber and normally engageable with said seat to close said rear end portion on the power stroke and during a part of the compression stroke of the engine and engageable with said stop on the expelling stroke of a fuel charge pumping mechanism to open said rear end portion to the valve chamber and to direct a charge through the by-passes into said forward end portion forwardly of the rear end of the latter, a packing within said tubular body and abutting the rear end of said charge conducting structure and adapted to encompass a stretch of said line, and a tubular plug extending into the other end of said structure abutting said packing and adjustably engaging said tubular body for clamping the latter, said conducting structure, disc and packing together and adapted to encompass another stretch of said line.

3. In a fuel feed system for internal combustion engines, a fuel conducting structure for opening at one end directly into the combustion chamber of the engine and provided at said end with a restricted fuel discharge port, a disc within said structure formed with an aperture registering with and of less diameter than said port, said structure being provided therein with a valve chamber, a front fuel passage leading from said chamber to said aperture, a rear fuel passage adapted to communicate with a fuel charge line and leading to said chamber, fuel by-passes leading from said chamber to said front passage and a normally seated valve for closing said rear passage and for closing the rear end of the front passage when unseated to provide for discharge from said chamber solely through the by-passes, said valves being moved from seated position relative to said rear fuel passage by the pressure of the fuel charge supplied to said rear passage from a fuel supply.

HARRY A. PALMER.